(12) United States Patent
Lippert

(10) Patent No.: US 10,619,832 B2
(45) Date of Patent: Apr. 14, 2020

(54) TOWER OBSTRUCTION LIGHT MOUNTING APPARATUS

(71) Applicant: Larry Lippert, Wilsonville, OR (US)

(72) Inventor: Larry Lippert, Wilsonville, OR (US)

( * ) Notice: Subject to any disclaimer, the term of this patent is extended or adjusted under 35 U.S.C. 154(b) by 227 days.

(21) Appl. No.: 15/732,048

(22) Filed: Sep. 11, 2017

(65) Prior Publication Data

US 2019/0078766 A1 Mar. 14, 2019

(51) Int. Cl.
| | | |
|---|---|---|
| *F21V 21/36* | (2006.01) | |
| *B64C 39/02* | (2006.01) | |
| *B64D 47/08* | (2006.01) | |
| *F21W 111/00* | (2006.01) | |

(52) U.S. Cl.
CPC ............ *F21V 21/36* (2013.01); *B64C 39/024* (2013.01); *B64D 47/08* (2013.01); *B64C 2201/108* (2013.01); *B64C 2201/128* (2013.01); *B64C 2201/146* (2013.01); *F21W 2111/00* (2013.01)

(58) Field of Classification Search
CPC . F21V 21/36; B64C 39/024; B64C 2201/108; B64C 2201/145; B64D 47/08; F21W 2111/00
See application file for complete search history.

(56) References Cited

U.S. PATENT DOCUMENTS

2016/0309346 A1\* 10/2016 Priest .................... B64C 39/024
2018/0257774 A1\* 9/2018 Volpi ....................... B25J 11/00

\* cited by examiner

*Primary Examiner* — Livius R. Cazan
(74) *Attorney, Agent, or Firm* — Thomas J. Wallen, P.E. Attorney at Law, L.L.C.; Eugene H. Eickholt

(57) ABSTRACT

A system for installation of an obstruction light on a tower, to alert pilots to the danger of a tower, is disclosed. The system comprises an unmanned aircraft system, the unmanned aircraft system including a light receiving pod adapted to releasably receive an obstruction light and light housing. The light receiving pod is permanently attached proximal to the unmanned aircraft system, wherein the light receiving pod comprising a hollow cylindrical tube. The system further includes an obstruction light housing specially adapted to be releasably received in the light receiving pod; and the system includes a light receiving fixture, the light receiving fixture permanently attached to a tower, including electrical and mechanical connections between the obstruction light housing and the light receiving fixture. The unmanned aircraft system remotely registers the obstruction light housing with the light receiving fixture, securing the obstruction light housing into the light receiving fixture while simultaneously making electrical connections with the light. Finally the unmanned aircraft system separates from the light leaving the light both electrically and mechanically connected. The process can be reversed to remove a burned out light.

4 Claims, 5 Drawing Sheets

TOWER OBSTRUCTION LIGHT MOUNTING APPARATUS

CROSS REFERENCE TO RELATED APPLICATIONS

None

STATEMENT REGARDING FEDERALLY SPONSORED RESEARCH OR DEVELOPMENT

Not Applicable

THE NAMES OF PARTIES TO A JOINT RESEARCH AGREEMENT

None

INCORPORATION BY REFERENCE OF MATERIAL SUBMITTED ON A COMPACT DISK

None

BACKGROUND OF THE INVENTION

Towers, including towers constructed for cellular communications, radio/TV transceivers and water towers require an FAA Certified lighting system that provides an unobstructed view to pilots. Current lighting systems typically require a crew to install and the installation costs are quite considerable. More importantly however is the incidence of injuries and ultimately fatalities associated with the lighting installation where human operators climb to the apex of towers. There exists a need for a safer and more cost effective system for lighting installation on towers.

BRIEF SUMMARY OF THE INVENTION

A cost effective and safe system is disclosed for initial installation and replacement of FAA Certified Obstruction lights, utilizing unmanned aircraft systems (UAS). Obstruction lights are mandatory on towers and warn pilots of the dangers associated with mid-air tower collisions.

Existing models of FAA Certified obstruction lights will be mechanically and electrically installed into a special housing which is in turn removably connected to a light capture pod; the light capture pod is designed to be attached to an unmanned aircraft system that delivers the obstruction light to a light receiving fixture permanently attached to the top of the tower. Electrical and mechanical connections are provided between the obstruction light housing and the light receiving fixture such that the obstruction light is electrically connected when it is delivered and mechanically attached to the light receiving pod by the unmanned aircraft system. Upon mechanical and electrical connection of the obstruction light housing, the obstruction light and housing separates from the light capture pod and the installation process is complete. The removal of the obstruction light is identical but the steps are conducted in revers order.

DETAILED DESCRIPTION OF THE INVENTION

Figure 1:
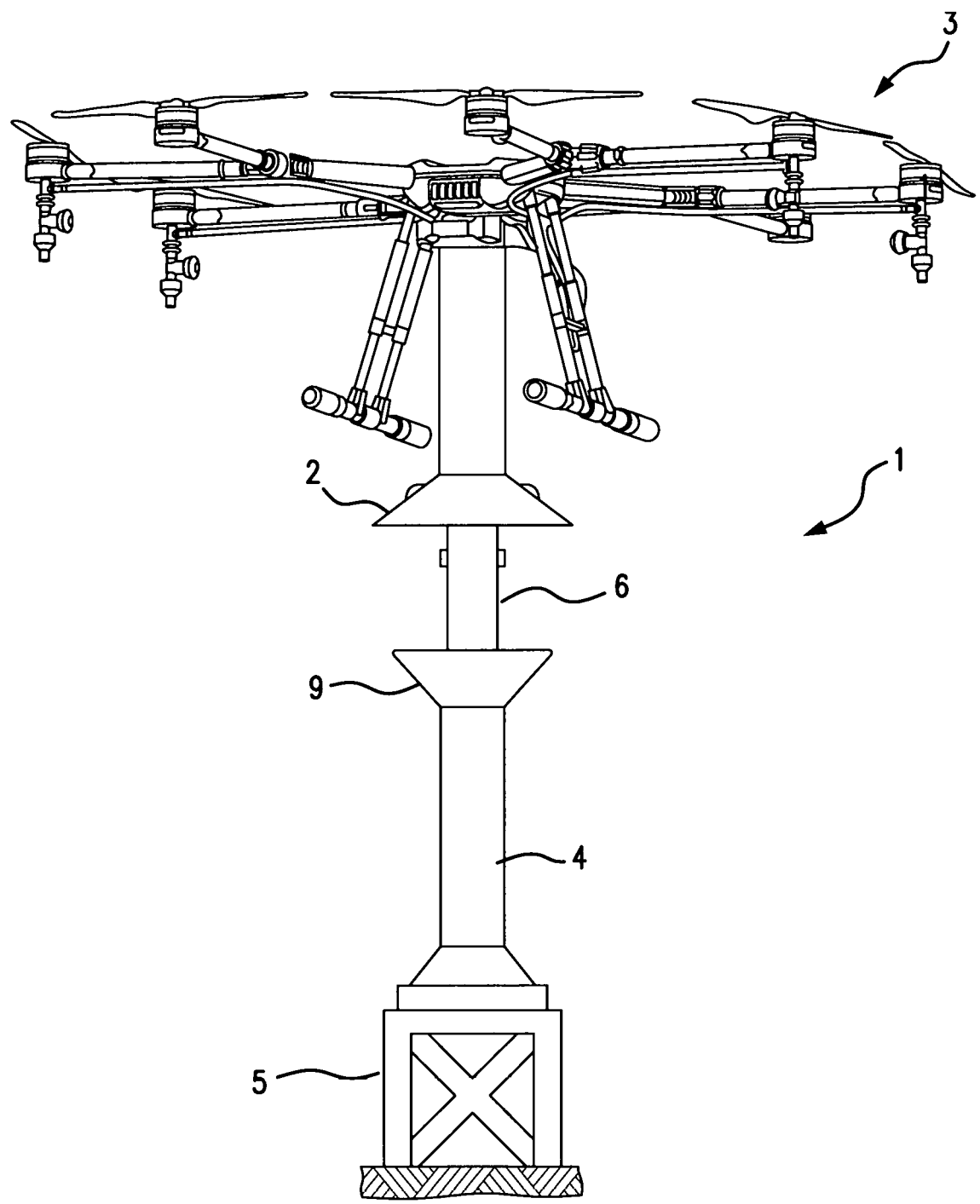
FIG. 1 shows the combination (1) of a light capture pod (2) interposed between an unmanned aircraft system (3) and a light receiving fixture (4), as an obstruction light with housing (6) is being installed atop a tower (5). Obstruction light with housing (6) is in an unsecured position.

Referring to FIG. 1, the combination (1) of light capture pod (2), unmanned aircraft system (3), light receiving fixture (4), and obstruction light (15) (best seen in FIG. 2) with housing (6) are seen together. Light receiving fixture (4) has been previously attached permanently to existing tower (5). Rotational bearings interposed between light receiving fixture (4) and the obstruction light housing (6) allow the obstruction light housing (6) to rotate as it is lowered into the receiving fixture (4) in order to align the mechanical and electrical connections. The purpose of an obstruction light (15) is to alert aircraft pilots to the location of a cell tower, and thus avoid extremely dangerous collisions. As seen in FIG. 1, Obstruction light (15) with housing (6) is in the process of installation, as mechanical connections (8) (seen in FIG. 4) remain unattached. Light receiving fixture (4) is circular and hollow, with an inside diameter slightly larger than the outside diameter of the obstruction light housing (6). In this way, the obstruction light housing (6) registers with and is inserted within the light receiving fixture (4). In the position as seen in FIG. 1, the light housing (6) has been partially inserted into light receiving fixture (4). In order to facilitate the alignment and installation of the light housing (6) into light receiving fixture (4), an inverted cone (9) is secured at the upper end of light receiving fixture (4).

Figure 2:
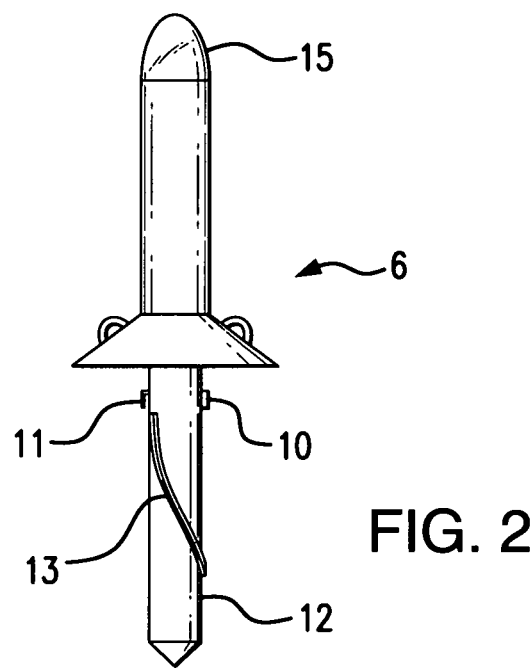
FIG. 2 shows an obstruction light with housing (6) according to the invention.

FIG. 2 depicts the light (15) and light housing (6) before installation. Electrical connections (10) and (11) are seen on opposite sides of base section (12). However, any conventional pair of electrical connections is usable and considered to be within the scope of the invention. In the preferred embodiment mechanical connection (8) comprises a mechanical thread (13) that spirals helically around the outside of (12) of the light housing (6), which threadingly engages with the inside surface of light receiving fixture (4) at (14). It must be appreciated that male threads could equally be used on the inside surface of light receiving fixture and corresponding female threads located on the outside surface of the light housing (6). Light (15) sits at the upper terminus of light housing (6). Light (15) may be a light emitting diode of various types including steady burning single and double red obstruction lights, high intensity flashing white lights (40 FPM, or flashes/minute), high intensity white flashing catenary lights (60) FPM), medium intensity flashing red obstruction lights (20-40 FPM), medium intensity flashing white obstruction lights (40 FPM), medium intensity white flashing catenary (60 FPM), medium intensity flashing dual red/white obstruction lights (20-40 FPM) and low intensity flashing red catenary lights (60 FPM) or any other FAA Certified Obstruction light, or similar device.

Figure 3:
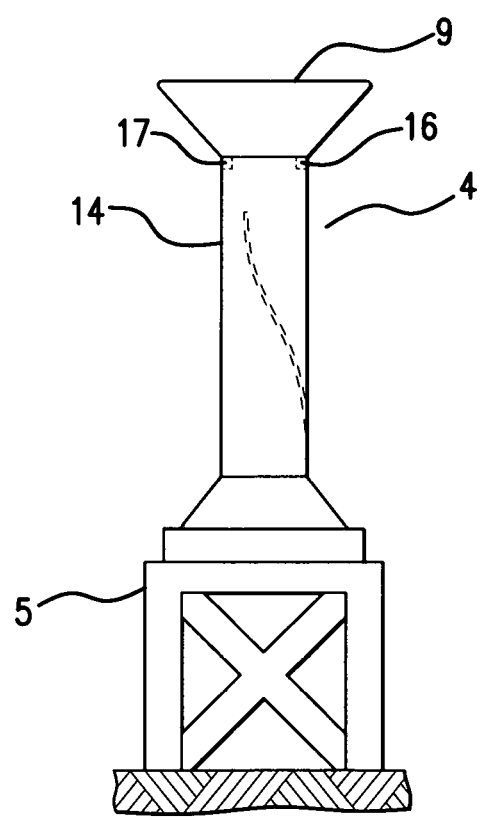
FIG. 3 shows the light receiving fixture (4) mounted on an existing tower structure (5).

Referring to FIG. 3, light receiving fixture (4) is shown as it appears attached to a tower (5) before light (15) and light housing (6) have been installed. Inside threads (14) are provided to receive outside threads (13) on the outer surface of the cylindrical base (12) of the light housing (6). Conical top opening (9) aids in the alignment and installation of light housing (6) when using an unmanned aircraft system (3).

Figure 4:
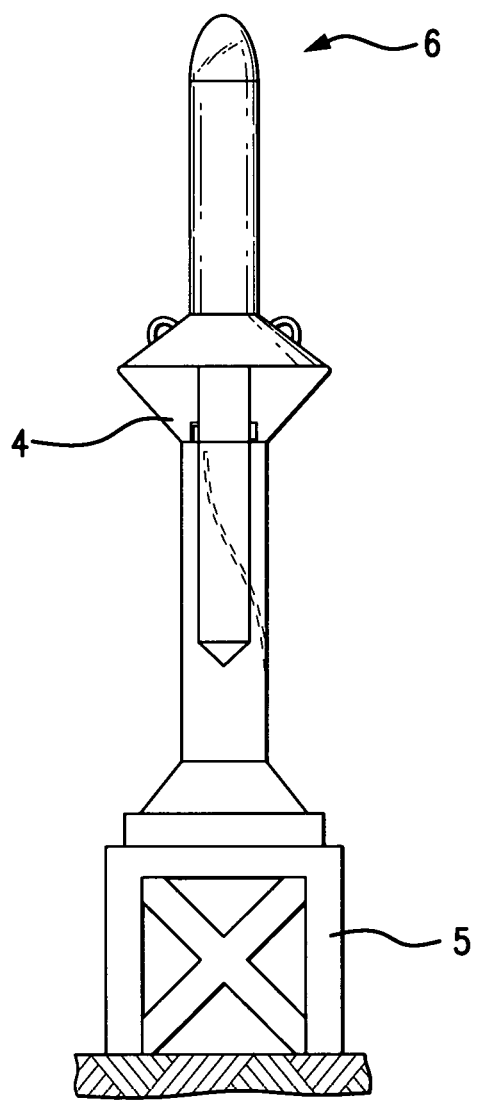
FIG. 4 shows an obstruction light with housing (6) installed atop existing tower (5), where the obstruction with light housing (6) is both electrically and mechanically connected to the light receiving fixture (4).

FIG. 4 shows light housing (6) after installation within light receiving fixture (4) has been completed. Outside threads (13) have been secured within inside threads (14) comprising mechanical connection (8) thus mechanically securing light housing (6) within light receiving fixture (4). Electrical connectors (10) and (11) (seen in FIG. 2), located on the outside surface of light (6), are adapted to engage electrical connections (16) and (17) (seen in FIG. 3) on the inside surface of light receiving fixture (4). Such mechanical threaded connections and electrical terminals are conventional in the lighting art. The particular electrical connectors utilized are not critical so long as a good secure electrical contact is established once the mechanical connection is complete. However, as will be described below, the helical mechanical thread engagement is particularly well adapted to facilitating a mechanical connection using the rotational bearings on the unmanned aircraft system.

Figure 5:
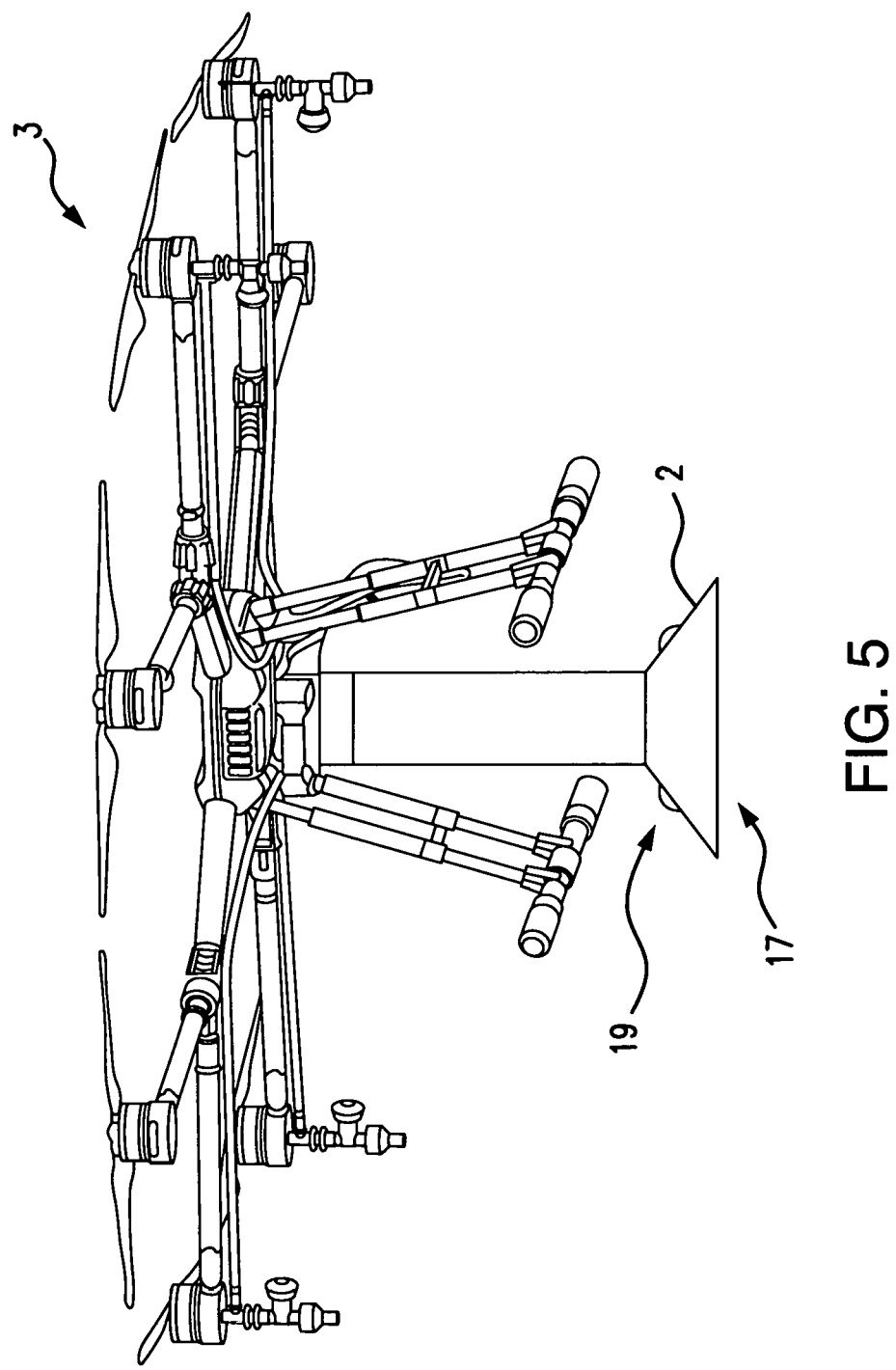
FIG. 5 shows the light capture pod (2) attached to the unmanned aircraft system (3).
Figure 6:
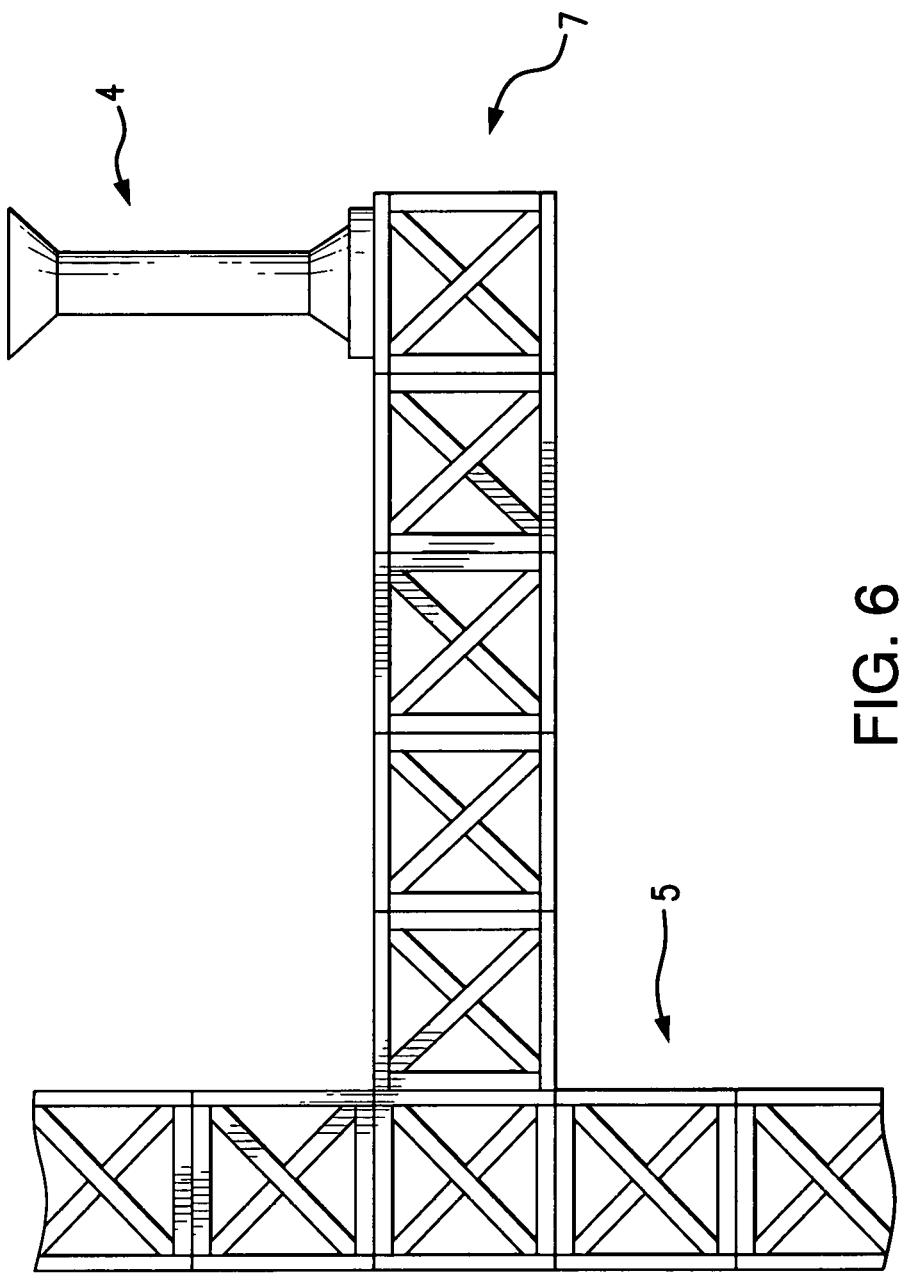
FIG. 6 shows the light receiving fixture (4) attached to a side extension mount (7) of a tower (5), ready for installation of an obstruction light with housing.

Referring to FIG. 5, light capture pod (2) is attached to unmanned aircraft system (3). Light capture pod (2) is in position and ready to accept light (15) and light housing (6) in anticipation of an installation. Similar to the top terminus of light receiving fixture (4), light capture pod (2) is provided with a funnel like conical end (18) that facilitates insertion of the upper, illuminated end of light (6). Locking mechanism (19) secures light housing (6) to light capture pod (2) in such a manner that light (6) can be disengaged from light capture pod (2) once a secure mechanical and electrical connection between light capture pod (2) and light receiving fixture (4) has been established. Locking mechanism (19) can comprise a sliding latch that will support the weight of light (15) and light housing (6) when light and housing (6) is in flight, before installation. Any detachable connection is within the scope of the invention and it is expressly understood that the invention is not limited to any particular set of mechanical or electrical connections.

The installation of obstruction lights proceeds in several steps. First, obstruction light (15) and housing (6) is secured into light capture pod (2). Light capture pod (2) is securely affixed to unmanned aircraft system (3) such that light capture pod cannot be separated from unmanned aircraft system (3) mid-flight. A simple remotely controlled latch mechanism (19) between obstruction light housing (6) and light capture pod is contemplated. The latch mechanism (19) must prevent premature mid-flight separation of light housing (6) from light capture pod (2). Alternatively, an electromagnetic connection could be established between obstruction light housing (6) and light capture pod (2). The electromagnetic connection could be released remotely following complete installation of light housing (6).

Second, unmanned aircraft system (3) is remotely guided over light receiving fixture (4), which is permanently secured to the apex of the tower. Next unmanned aircraft system (3) is lowered vertically and obstruction light housing (6) is registered with light receiving fixture (4). Due to the rotational motion of the aeronautical unmanned aircraft system (3), male threads (13) on the outside surface of light housing (6) threadingly engage female threads (14) on the inside surface of light receiving fixture (4). When light housing (6) is completely engaged in light receiving fixture (4), positive and negative electrical contacts are also completed. This of course enables the unmanned aircraft system operator to verify a complete installation, because the light (15) can be illuminated signifying the installation has been successful. Upon installation of light housing (6), unmanned aircraft system (3) is vertically raised and separated from light housing (6).

Third, when the obstruction light (15) burns out, the unmanned aircraft system (3) is used to remove the burned out obstruction light (15) with light housing (6). The unmanned aircraft system (3) with the attached empty capture pod (2) is positioned above the tower light receiving fixture (4) with existing light (15). The unmanned aircraft system (3) lowers together with the light capture pod (2) and connects to the light housing (6). At this point the rotational direction of unmanned aircraft system (3) is changed, and mechanical connection (8) engages. The unmanned aircraft system (3) then raises the light (15) and light housing (6) from the light receiving fixture (4). As the light (15) and light housing (6) are rotated they are lifted out of the light receiving fixture (4) the mechanical and electrical connections are disengaged. The burned out light (15) is returned to the ground, where a technician can exchange the light (15) in the housing for a functional bulb. The new light and light housing are then installed in accordance with steps one and two above. It is understood that light (15) can be separated from light housing (6) whereby light housing (6) can be reused.

Essential to the invention is a specialized unmanned aircraft system (3) including autopilot stabilization, redundant communications links and safety systems, a downward focused radar, live video feed and the ability to carry the weight of the capture pod, the light and the housing for the time necessary to conduct each step of the operation. The purpose of the software, video feed and radar, is to enable the operator to accurately guide the unmanned aircraft system into position, register light housing (6) with light receiving fixture (4) and complete the mechanical and electrical connections. Specialized unmanned aircraft system software assists in the automatic attaching of light (6) to the light receiving fixture (4) and subsequent detaching of the light (6) from unmanned aircraft system (3). Unmanned aircraft system equipment and software usable herein are well known and commercially available for various applications.

The invention claimed is:

1. A system for installation of an obstruction light on a tower, to alert pilots to the danger of a tower, the system comprising an unmanned aircraft system, the unmanned aircraft system including a light receiving pod adapted to releasably receive an obstruction light and light housing, wherein the light receiving pod is permanently attached to the unmanned aircraft system, the light receiving pod comprising a hollow cylindrical tube, the system further comprising an obstruction light housing specially adapted to be releasably received in the light receiving pod, wherein the system is adapted to deliver an obstruction light to a light receiving fixture, the light receiving fixture permanently attached to a tower, including electrical and mechanical connections on the outside surface of the obstruction light housing to establish a mechanical and electrical connection between the obstruction light housing and the light receiving fixture, wherein the unmanned aircraft system is adapted to remotely register the obstruction light housing with the light receiving fixture, and is adapted to further secure the obstruction light housing into the light receiving fixture while simultaneously electrically connecting the obstruction light, and wherein the unmanned aircraft system is adapted to separate from the obstruction light housing leaving the obstruction light both electrically and mechanically connected.

2. The system of claim 1 wherein the light receiving pod includes a conically flaring section distal from the unmanned aircraft system and the light receiving fixture includes a conically flaring section distal from the tower.

3. The system of claim 2 further including radar apparatus and a video camera mounted on the unmanned aircraft system, and radio transmission apparatus capable of transmitting signals to audiovisual equipment.

4. The system of claim 3 further including software that automatically aligns the unmanned aircraft system over the light receiving fixture, installs the obstruction light housing, and separates the unmanned aircraft system from the obstruction light housing.

\* \* \* \* \*